(12) United States Patent
Shibata

(10) Patent No.: US 11,575,833 B2
(45) Date of Patent: Feb. 7, 2023

(54) CONTROL APPARATUS, IMAGE PICKUP APPARATUS, CONTROL METHOD, AND MEMORY MEDIUM

(71) Applicant: CANON KABUSHIKI KAISHA, Tokyo (JP)

(72) Inventor: Nobuhiro Shibata, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/230,857

(22) Filed: Apr. 14, 2021

(65) Prior Publication Data
US 2021/0337122 A1 Oct. 28, 2021

(30) Foreign Application Priority Data

Apr. 22, 2020 (JP) .............................. JP2020-076365

(51) Int. Cl.
*H04N 5/232* (2006.01)
*H04N 3/14* (2006.01)

(52) U.S. Cl.
CPC ....... *H04N 5/23258* (2013.01); *H04N 3/1562* (2013.01); *H04N 5/2329* (2013.01); *H04N 5/23212* (2013.01)

(58) Field of Classification Search
None
See application file for complete search history.

(56) References Cited

U.S. PATENT DOCUMENTS

2013/0004150 A1* 1/2013 Wakamatsu ..... H04N 5/232122
396/55
2017/0019612 A1* 1/2017 Kino .................. H04N 5/23287

FOREIGN PATENT DOCUMENTS

JP 2009-162932 A 7/2009

* cited by examiner

*Primary Examiner* — Quan Pham
(74) *Attorney, Agent, or Firm* — Canon U.S.A., Inc. IP Division

(57) ABSTRACT

An apparatus includes a calculation unit configured to calculate a target correction amount based on a shake, a stabilization control unit configured to provide control on driving of a sensor in a direction intersecting an optical axis of a pickup optical system, based on the target correction amount, an autofocusing control unit configured to provide control on focusing based on an image signal output from the sensor, and a setting unit configured to set a limit value for the target correction amount based on a characteristic of the pickup optical system and focusing accuracy of the autofocusing unit. The setting unit is configured to change the limit value depending on the pickup condition, and is capable of setting a first limit value based on the characteristic and a second limit value based on the focusing accuracy.

17 Claims, 7 Drawing Sheets

CONTROL APPARATUS, IMAGE PICKUP APPARATUS, CONTROL METHOD, AND MEMORY MEDIUM

BACKGROUND OF THE DISCLOSURE

Field of the Disclosure

The aspect of the embodiments relates to a control apparatus and an image pickup apparatus each of which provides control on image stabilization.

Description of the Related Art

Conventionally, an image pickup apparatus is known which can perform image blur correction (image stabilization) by driving an image sensor in a direction intersecting an optical axis of an image pickup optical system. A range of such image blur correction has a mechanical limit which is also referred to as a correction limit. In addition to the mechanical limit, there is a limit (image limit) due to an image circle diameter and a limit (AF limit) for preventing focusing accuracy of autofocus (AF) in an image pickup plane from being deteriorated. Japanese Patent Laid-Open No. ("JP") 2009-162932 discloses a method of limiting the correction limit in consideration of focusing accuracy at the time of AF.

However, the method disclosed in JP 2009-162932 cannot perform proper control based on an image pickup condition such as a single image pickup mode or a consecutive image pickup mode.

When capturing an image, the image sensor performs image stabilization operation within the AF limit so as to prevent the focusing accuracy from being deteriorated during AF which is operation before exposure. Next, when the exposure operation starts, since the AF has already been completed, the AF limit is released and the image stabilization operation is performed within the image limit so that the image quality is not deteriorated. In general, the AF limit is narrower than the image limit, and therefore the range for performing the image stabilization operation during exposure is wider. Thus, in the single image pickup mode, the limit is switched from the AF limit to the image limit as a driving range of the image sensor. The single image pickup mode has time to smoothly switch the limit when changing from before exposure to during exposure.

On the other hand, in the consecutive image pickup mode, the time between exposures, that is time between frames, becomes short so that the number of images is increased. Further, the AF is performed again between the frames, and thus switching from the image limit to the AF limit occurs. When the image sensor approaches in the vicinity of the image limit during exposure due to an effect of a large shake and the limit steeply switches to the AF limit at the time between the frames, vibration caused by inertia of the image sensor is transmitted to the users handle as a vibration feeling, and may cause uncomfortable feeling.

SUMMARY OF THE DISCLOSURE

An apparatus as one aspect of the embodiments includes a calculation unit configured to calculate a target correction amount based on a shake detected by a detection unit, a stabilization control unit configured to provide control on driving of a sensor in a direction intersecting an optical axis of a pickup optical system, based on the target correction amount, an autofocusing control unit configured to provide control on focusing based on an image signal output from the sensor; and a setting unit configured to set a limit value for the target correction amount based on a characteristic of the pickup optical system and focusing accuracy of the autofocusing unit. The setting unit is configured to change the limit value depending on the pickup condition and is capable of setting a first limit value based on the characteristic and a second limit value based on the focusing accuracy.

Further features of the disclosure will become apparent from the following description of exemplary embodiments with reference to the attached drawings.

DESCRIPTION OF THE EMBODIMENTS

Figure 1:
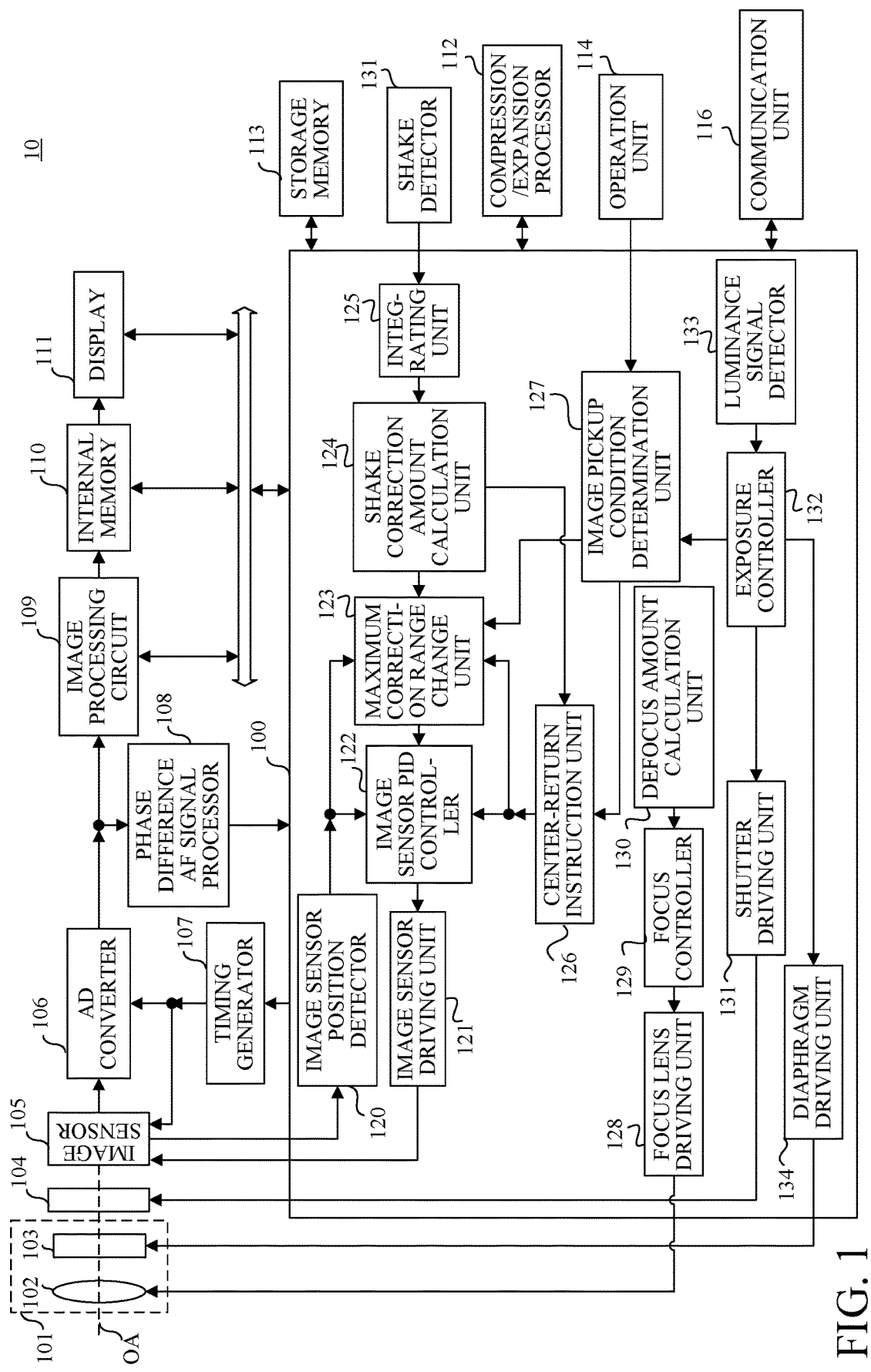
FIG. 1 is a block diagram illustrating an image pickup apparatus according to this embodiment.

First, a description will be given of an image pickup apparatus in this embodiment with reference to FIG. 1. FIG. 1 is a block diagram illustrating an image pickup apparatus 10 which is a digital camera. In this embodiment, the image pickup apparatus 10 is a lens interchangeable type image pickup apparatus and includes an image pickup apparatus main body (camera main body) and a lens unit 101 which is an interchangeable lens and is detachably attachable to the image pickup apparatus main body. However, this embodiment is not limited to this, and is also applicable to a lens integrated type image pickup apparatus in which an image pickup apparatus main body and a lens unit are integrally configured.

In general, in the lens interchangeable type image pickup apparatus 10, a focus lens 102 and a diaphragm unit 103 are disposed inside the lens unit 101. The focus lens 102 is configured to adjust an in-focus position. The diaphragm unit 103 and a shutter unit 104 are configured to adjust an amount of light. An image sensor 105, such as a CCD (charge-coupled device) sensor or a CMOS (complement metal-oxide semiconductor) sensor, is configured to receive light that has passed through the lens unit 101, and to convert the light from an optical signal to an electric signal. The image sensor 105 is configured to photoelectrically convert an optical image, which is an object image, formed via an image pickup optical system in the lens unit 101.

The shutter unit 104 is a mechanical focal plane shutter, which includes a front curtain blade and a rear curtain blade. When the image sensor 105 is in a non-image pickup state or a motion image pickup state, the front curtain blade and the rear curtain blade are in an exposure position, and an image pickup light beam passes and enters the image sensor 105. When an image is to be captured, the front curtain blade moves from the light-shielding position to the exposure position by performing exposure traveling, and the image pickup light beam passes. After a set exposure time, that is a shutter speed, has elapsed, the rear curtain blade moves from the exposure position to the light-shielding position by performing light-shielding traveling, and image pickup operation is completed for one piece of image data. The above description is a description of exposure control that adjusts an amount of light by using the mechanical front curtain and the mechanical rear curtain of the shutter unit 104. On the other hand, an exposure control method with an electronic front curtain and a mechanical rear curtain may be used by combining an electrical reset and the rear curtain of the shutter unit 104. The image sensor 105 can also optically correct image blur (perform image stabilization operation) by moving in a direction intersecting an optical axis OA (a direction orthogonal to the optical axis OA).

A luminance signal detector 133 is configured to detect a signal as luminance of an object and a scene, the signal having been read from the image sensor 105 and having passed through an AD converter 106. An exposure controller 132 is configured to calculate an exposure value, such as the shutter speed or an aperture diameter, based on the luminance information acquired by the luminance signal detector 133, and to transmit the calculated result to a shutter driving unit 131 and a diaphragm driving unit 134. The shutter driving unit 131 is configured to drive the shutter unit 104 based on the shutter speed, and the diaphragm driving unit 134 is configured to drive the diaphragm unit 103 based on an aperture diameter. The exposure controller 132 is also configured to provide control on amplification of an image pickup signal that has been read from the image sensor 105. According to the above description, autoexposure control (AE control) is performed.

The AD converter 106 is configured to perform noise removal processing, gain adjustment processing, and AD conversion processing on the image pickup signal read from the image sensor 105, and to output a processed signal to each of a phase difference AF signal processor 108 and an image processing circuit 109. A timing generator 107 is configured to control driving timing for the image sensor 105 and output timing for the AD converter 106, based on an instruction from a camera controller 100 as a control apparatus.

The phase difference AF signal processor 108 is configured to acquire a pair of image signals, an A image and B image, for focus detection, from the image sensor 105. The acquired pair of image signals are subjected to averaging processing for reducing an effect of signal noise, and thereafter the averaged signals are subjected to filter processing for extracting a signal component in a predetermined frequency band. Subsequently, the phase difference AF signal processor 108 executes, on the filtered signal, calculation for a correlation amount (correlation calculation) between the image signals. The accuracy in this correlation calculation, i.e., focusing accuracy, depends on an optical characteristic of the lens unit 101. Hence, the accuracy in the correlation calculation increases as the center position of the image sensor 105 matches the optical axis OA, which is a path of light passing through the lens unit 101.

A defocus amount calculation unit 130 is configured to calculate the defocus amount for the correlation amount calculated from the image shift amount between the A image and the B image each of which is acquired from the phase difference AF signal processor 108. A focus controller 129 is configured to control a driving direction and a driving amount for the focus lens 102, based on the output result from the defocus amount calculation unit 130. A focus lens driving unit 128 is configured to drive the focus lens 102 based on the driving direction and the driving amount each of which is controlled by the focus controller 129. In this embodiment, the focus controller 129 and the defocus amount calculation unit 130 are included in an autofocusing unit configured to control focusing based on the image signal output from the image sensor 105. In this embodiment, an autofocusing operation is performed from the calculation of the defocus amount by the defocus amount calculation unit 130 to the driving of the focus lens 102 by the focus lens driving unit 128.

An image processing circuit 109 is configured to perform pixel interpolation processing, color conversion processing, and the like on the image data output from the AD converter 106, and thereafter to transmit the processed image data to an internal memory 110. A display 111 is configured to display image pickup information and the like together with the image data stored in the internal memory 110.

A compression/expansion processor 112 is configured to perform compression processing or decompression processing on the data stored in the internal memory 110, depending on an image format. A storage memory 113 is configured to store various data such as a parameter. An operation unit 114 is a user interface for a user to perform various menu operations and mode switching operations. For example, the user can switch between the consecutive image pickup mode and the single image pickup mode by operating the operation unit 114 when a still image is to be captured.

The camera controller 100 includes an operation apparatus such as a CPU (central processing unit), and is configured to execute various control programs stored in the internal memory 110 in response to a user operation on the operation unit 114. The control program is, for example, a program for performing image stabilization control, autoexposure control, autofocusing control, and the like. The lens interchangeable type image pickup apparatus 10 is configured to perform transmission of information between the camera main body and the lens unit 101 via a communication unit 116.

A shake detector 141 is a sensor configured to detect a shake applied to the image pickup apparatus 10. Generally, as a sensor for detecting vibration of a shake, a gyro sensor (gyro) is used which is configured to detect an angular velocity of vibration.

An image sensor position detector 120 is configured to detect a position of the image sensor 105 which can drive in a direction intersecting (a direction orthogonal to) the optical axis OA. An image sensor driving unit 121 is configured to drive the image sensor 105 in a direction intersecting the optical axis OA. An image sensor PID controller 122 is configured to perform feedback control by performing PID (proportional control, integral control, and differential control) calculation on a deviation between a target position and a current position of the image sensor 105, the current position being detected by the image sensor position detector 120. In this embodiment, the image sensor position detector 120, the image sensor driving unit 121, and the image sensor PID controller 122 are included in an image stabilization unit configured to drive the image sensor 105 in a direction intersecting the optical axis OA of the image pickup optical system, based on the target correction amount. The feedback control by the PID is a well-known technique, and thus a detailed description thereof will be omitted.

Next, a description will be given of calculation for the target position of the image sensor 105. The position of the image sensor 105 can be controlled by converting an angular velocity detected by the shake detector 141 into an angle that is one dimension higher. As a method of making the angular velocity one dimension higher, there is a method of using integrating processing by an integrating unit 125 or using low-pass filter processing (LPF processing). A shake correction amount calculation unit (calculation unit) 124 is configured to calculate the target correction amount based on a shake detected by the shake detector 141. Specifically, the shake correction amount calculation unit 124 multiplies the output value from the integrating unit 125 by lens sensitivity information acquired via the communication unit 116. The lens sensitivity information is a value that changes based on a focal length and an object distance of the lens unit 101, and the shake correction amount is optimized by being weighted depending on each lens unit and each state of the lens unit.

An image pickup condition determination unit 127 is configured to determine an image pickup condition set by the user operating the operation unit 114. The image pickup condition is, for example, an image pickup mode such as a single image pickup mode and a consecutive image pickup mode. Based on the determination result, the image pickup condition determination unit 127 outputs a predetermined signal to a maximum correction range change unit 123 as a setting unit and to a center-return instruction unit 126.

Figure 2A:
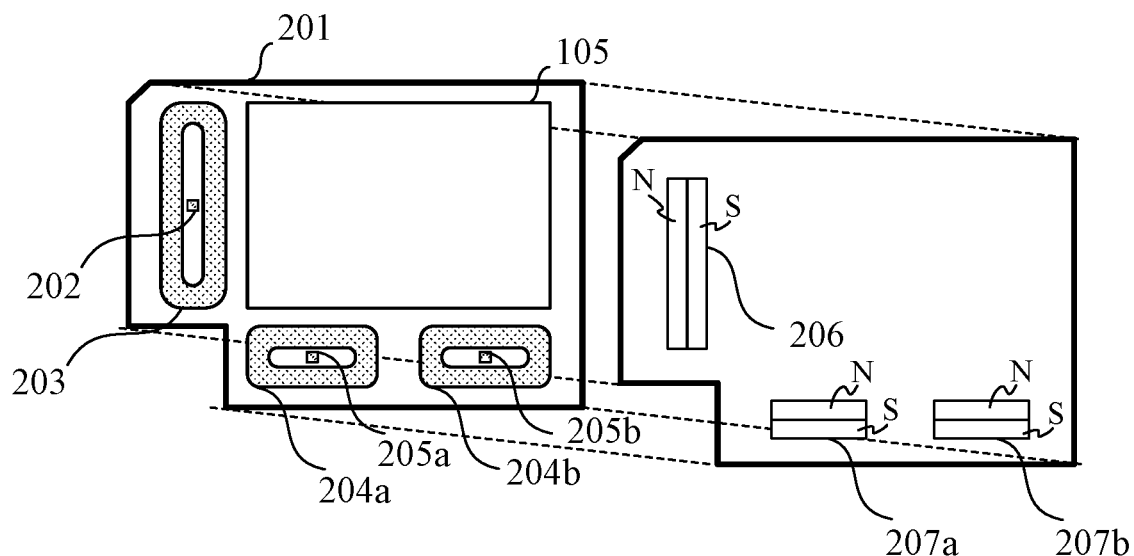
FIGS. 2A to 2D are exploratory diagrams each illustrating an image stabilization mechanism of an image sensor according to this embodiment.

Next, with reference to FIG. 2A to 2D, a description will be given of a driving principle of the image sensor 105 and an effect on an image quality at a time when the image sensor 105 is driven particularly in a roll direction. FIG. 2A is an explanatory diagram illustrating an image stabilization driving unit 201 including the image sensor 105. In FIG. 2A, the left side is an upper part and the right side is a lower part, and those are attached to each other.

The upper part includes an X-axis driving coil 203, a position sensor 202 which is a Hall element and is configured to detect a shift in an X-axis direction, Y-axis driving coils 204a and 204b, and position sensors 205a and 205b each of which is configured to detect a shift in a Y-axis direction. The lower part includes an X-axis permanent magnet N pole and S pole 206 which is paired with the X-axis driving coil, a Y-axis permanent magnet N pole and S pole 207a which is paired with the Y-axis driving coil 204a, and a Y-axis permanent magnet N pole and S pole 207b which is paired with the Y-axis driving coil 204b.

Figure 2B:
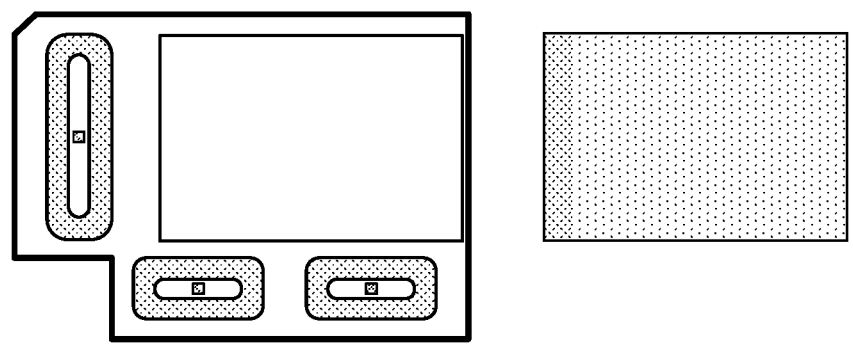

FIG. 2B is a diagram illustrating a state in which the X-axis driving coil 203 is energized. A magnetic flux generated in the coil by energizing the X-axis driving coil 203 and a magnetic flux generated by the X-axis permanent magnet N pole and S pole 206 magnetically interfere with each other and generate a Lorentz force. The image stabilization driving unit 201 linearly moves in the X direction using this Lorentz force as a thrust, i.e., a driving force. At that time, normally, the image stabilization driving unit 201 is not driven to a limit because if the image stabilization driving unit 201 is driven extremely to + side or − side in the X-axis direction, the light passing through the lens causes uneven exposure on the image sensor 105 as illustrated in the right-side drawing in FIG. 2B illustrating an image displayed on the display 111 of the image pickup apparatus 10.

Figure 2C:
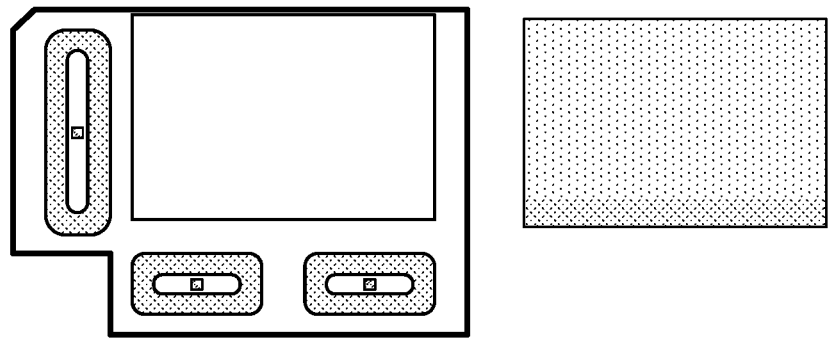

FIG. 2C is a diagram illustrating a state in which the Y-axis driving coils 204a and 204b are energized in a same direction. When the Y-axis driving coils 204a and 204b are energized in the same direction, the image stabilization driving unit 201 moves linearly in the Y direction using a Lorentz force as a thrust, that is a driving force, on the same principle as the movement in the X-axis. At that time, normally, the image stabilization driving unit 201 is not driven to a limit as in the movement in the X direction because if the image stabilization driving unit 201 is driven extremely to + side or − side in the Y-axis direction, the light passing through the lens causes uneven exposure on the image sensor 105 as illustrated in the right-side drawing in FIG. 2C illustrating an image displayed on the display 111 of the image pickup apparatus 10.

Figure 2D:
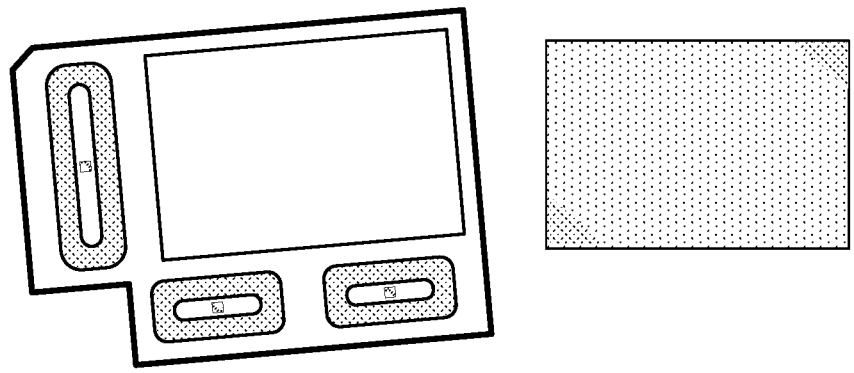

FIG. 2D is a diagram illustrating a state in which the Y-axis driving coils 204a and 204b are energized in opposite directions. When the Y-axis driving coils 204a and 204b are energized in the opposite directions, the image stabilization driving unit 201 rotationally moves using a Lorentz force as a thrust, that is a driving force, on the same principle as the movement in the X-axis. At that time, uneven exposure is likely to occur such that the left, right, top and bottom become uneven.

A slit width during slit traveling is narrow in particular when a control method for exposure is a method using the electronic front curtain and the mechanical rear curtain, in which the electrical reset and the rear curtain of the shutter unit 104 are combined, and a shutter speed is a high-speed (for example, the exposure time, i.e., shutter speed, is 1/1000 [s]). Thus, in such a case, exposure is likely to vary. As a result, when an image is captured with the electronic front curtain, the mechanical rear curtain, and the high shutter speed, uneven exposure or varied exposure (hereinafter simply referred to as uneven exposure) is likely to occur. Therefore, the rotation in the roll direction may be restored, that is, roll return may be performed, and correction in roll direction may not be performed after that. When an image is captured at the high shutter speed, the effect of a camera shake is small, and thus more natural image is acquired by performing control such that the exposure variation is reduced.

Figure 3A:
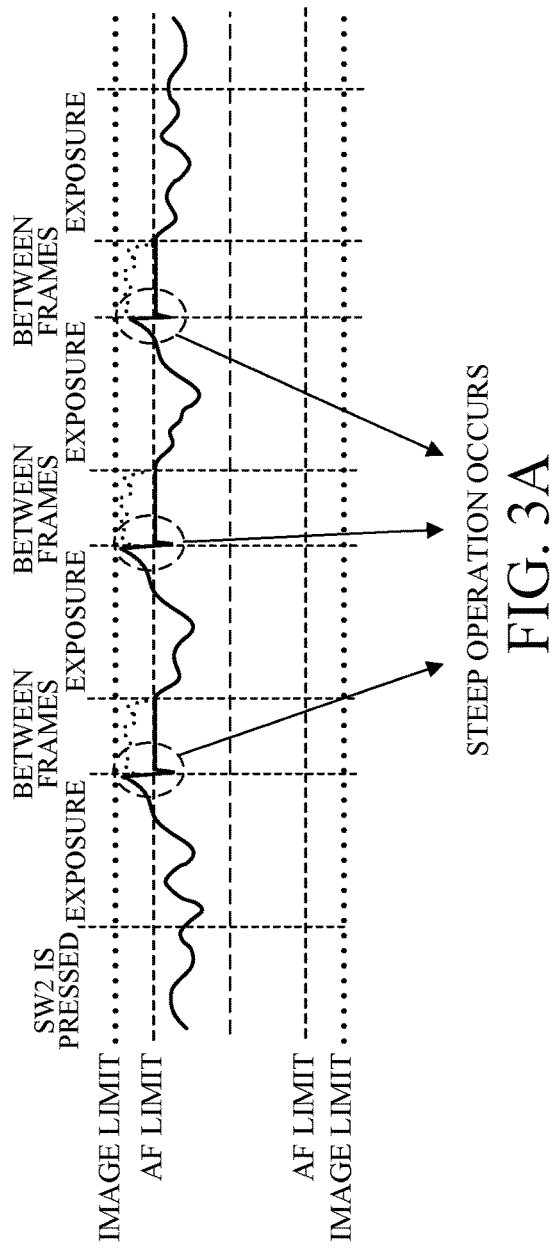
FIGS. 3A and 3B are exploratory diagrams each illustrating a maximum correction range change unit according to this embodiment.
Figure 3B:
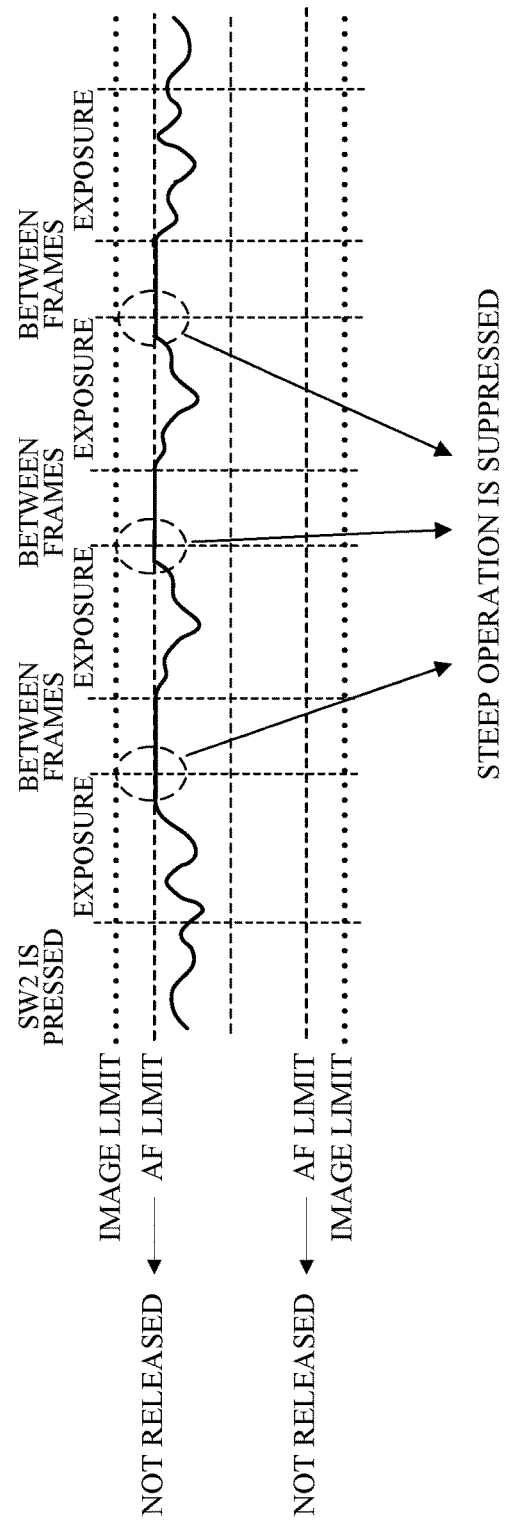

Next, the maximum correction range change unit 123 as a setting unit will be described with reference to FIGS. 3A and 3B. FIGS. 3A and 3B are explanatory diagrams for the maximum correction range change unit 123. FIG. 3A is an explanatory diagram for a comparative example, and FIG. 3B is an explanatory diagram for this embodiment. In each of FIGS. 3A and 3B, a horizontal axis represents time, and a vertical axis represents a combined shake correction amount in the pitch direction, yaw direction, and roll direction.

In a state before exposure starts, the maximum correction range change unit 123 sets an AF limit (second limit value) in a driving range for the image sensor 105 so as to improve accuracy for the defocus amount used in the phase difference AF. Next, during exposure, the AF operation has already been completed, and thus the maximum correction range change unit 123 releases the AF limit. During the exposure period, the maximum correction range change unit 123 sets an image limit (first limit value) so as to properly maintain resolution and a peripheral light amount in the image pickup plane based on the optical characteristic of the lens unit 101 as an image pickup optical system.

In a recent image pickup apparatus, the AF limit tends to be narrower than the image limit so that the focusing accuracy is acquired with an improved level. The single image pickup mode has adequate time for switching from the AF limit to the image limit, the image sensor 105 does not steeply operate at the time of switching.

However, as indicated in FIG. 3A, after the consecutive image pickup starts, i.e., a switch SW2 is pressed, time between frames is not adequate particularly for a large shake, and the image sensor 105 may steeply operate at the time of switching.

Thus, in the consecutive image pickup mode, as illustrated in FIG. 3B, the maximum correction range change unit 123 is controlled so that the AF limit is not released, that is, so that switching to the image limit is not performed. Thereby, it is possible to prevent the image sensor 105 from steeply operating at the beginning of the time between the frames, the steep operation being as illustrated in FIG. 3A.

At this time, the effect of the image stabilization may become slightly weaker than the effect thereof at the time of switching to the image limit during exposure. However, it is considered that the effect of the image stabilization may become weaker in any case because a large amount of shake occurs such that the AF limit is exceeded. Therefore, the control is performed with priority given to preventing occurrence of the steep operation that gives the user uncomfortable feeling.

Figure 4A:
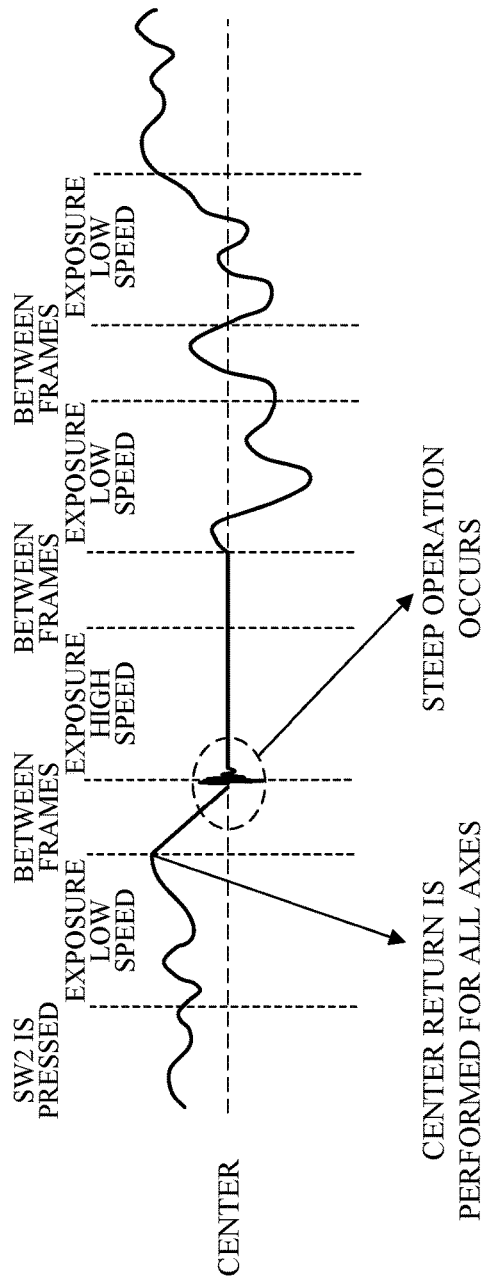
FIGS. 4A and 4B are explanatory diagrams each illustrating a center-return instruction unit according to this embodiment.
Figure 4B:
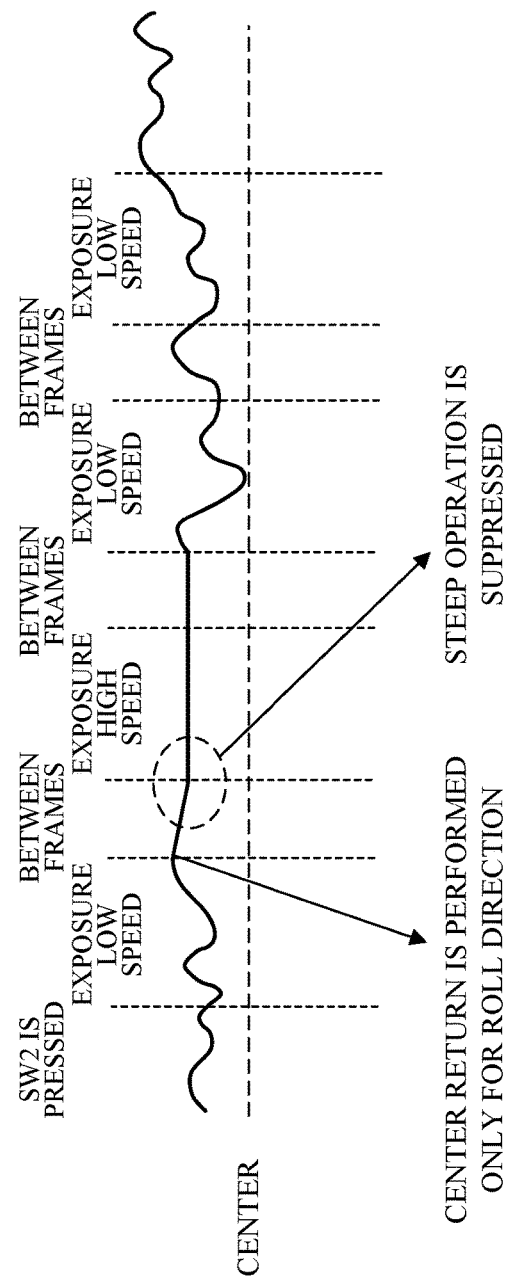

Next, a description will be given of the center-return instruction unit 126 with reference to FIGS. 4A and 4B. FIGS. 4A and 4B are explanatory diagrams for the center-return instruction unit 126. FIG. 4A is an explanatory diagram for a comparative example, and FIG. 4B is an explanatory diagram for this embodiment. In each of FIGS. 4A and 4B, a horizontal axis represents time, and a vertical axis represents a combined shake correction amount in the pitch direction, yaw direction, and roll direction.

FIG. 4A illustrates a case where a shutter speed is switched from a low speed to a high speed in the middle of the consecutive image pickup mode, and uneven exposure is made to be inconspicuous by performing center return in all of the pitch direction, yaw direction, and roll direction, that is, by performing all axes center return. Uneven exposure may be slightly conspicuous when the image stabilization is performed also in the pitch and yaw directions, though not as conspicuous as uneven exposure caused by the image stabilization in the roll direction. When the all axes center return is performed, steep operation by the image sensor 105 is likely to occur because operation ranges are larger in the pitch direction and yaw direction than in the roll direction.

FIG. 4B illustrates a case where the shutter speed is switched from the low speed to the high speed in the middle of the consecutive image pickup mode, and uneven exposure is made to be inconspicuous by performing center return in the roll direction in which uneven exposure is most conspicuous. On the other hand, in the pitch direction and the yaw direction, the image stabilization operation is stopped and the positions immediately before exposure are held. In this case, it is possible to suppress the occurrence of steep operation by the image sensor 105 while minimum necessary reduction of conspicuous uneven exposure is performed. Although the image stabilization operation is stopped, when the shutter speed is high, the effect of a camera shake is originally small, and thus control is performed with priority given to preventing occurrence of steep operation that gives the user uncomfortable feeling.

Figure 5:
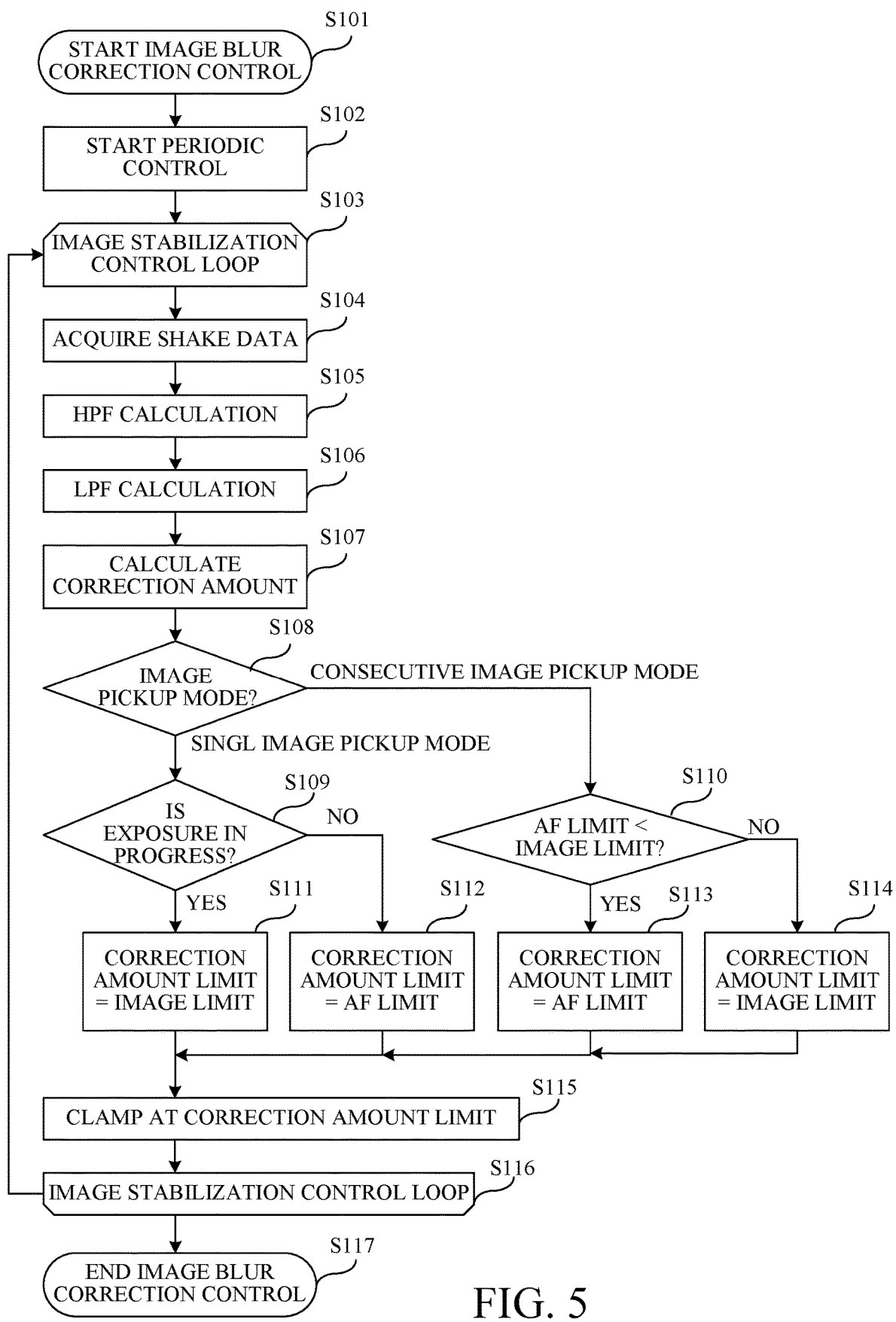
FIG. 5 is a flowchart illustrating a control method according to this embodiment.

Next, a description will be given of an image blur correction processing (image stabilization control method) performed by the image pickup apparatus 10 with reference to FIG. 5. FIG. 5 is a flowchart illustrating image blur correction processing as a control method. FIG. 5 illustrates switching processing on correction amount limits, i.e., limit values for the target correction amount, in the single image pickup mode as a first mode and the consecutive image pickup mode as a second mode.

First, in step S101, the camera controller 100 starts image blur correction control, that is image stabilization control. Subsequently, in step S102, the camera controller 100 starts periodic control for loop processing of the image stabilization control. When the periodic control for the loop processing of the mage stabilization control, steps S103 to S116 are executed by the periodic control.

In step S104, the camera controller 100 acquires shake data, which is angular velocity data of a shake, based on a shake detected by the shake detector 141. Subsequently, in step S105, the camera controller 100 performs HPF calculation so as to remove an offset component caused by a temperature drift in the shake detector 141 or the like. Subsequently, in step S106, the camera controller 100 (integrating unit 125) converts the shake data into angle data by raising a dimension of the shake data.

Subsequently, in step S107, the camera controller 100 (shake correction amount calculation unit 124) calculates a final shake correction amount, that is a target correction amount, by multiplying the angle data, which is an output result from the integrating unit 125, by a constant depending on the optical characteristic of each lens unit. Subsequently, in step S108, the camera controller 100 (image pickup condition determination unit 127) determines whether the image pickup mode (image pickup condition) is set to the single image pickup mode or the consecutive image pickup mode. When the image pickup mode is set to the single image pickup mode, the process proceeds to step S109.

In step S109, the camera controller 100 (image pickup condition determination unit 127) determines whether or not exposure is in progress. When the exposure is in progress, the process proceeds to step S111. In step S111, the camera controller 100 is not to perform the focusing processing, and thus the image limit (first limit value based on the optical characteristic) is set as the correction amount limit (limit value for the target correction amount) for the shake correction amount. On the other hand, when the exposure is not in progress in step S109, the process proceeds to step S112. In step S112, the camera controller 100 is to perform the focusing processing, and thus the AF limit (second limit value based on the focusing accuracy) is set as a correction amount limit (limit value for the target correction amount) for the shake correction amount.

As described above, the maximum correction range change unit 123 as a setting unit switches between the first limit value based on the optical characteristic and the second limit value based on the focusing accuracy, depending on the image pickup condition. The image pickup condition may be the image pickup mode including the single image pickup mode and the consecutive image pickup mode. In the single image pickup mode, the setting unit sets the limit value to the first limit value during the exposure period, and to the second limit value during the period other than the exposure period. In the consecutive image pickup mode, the setting unit may set the second limit value during both the exposure period and the period other than the exposure period.

When the image pickup mode is set to the consecutive image pickup mode in step S108, the process proceeds to step S110. In step S110, the camera controller 100 (maximum correction range change unit 123) determines whether or not the range of the correction amount specified by the image limit (first limit value) is larger than the range of the correction amount specified by the AF limit (second limit value). When the range of the correction amount specified by the AF limit is narrower than the range of the correction amount specified by the image limit, the image sensor 105 may steeply operate at the time of switching the limit.

Hence, in step S113, the maximum correction range change unit 123 sets, to the AF limit, the correction amount limit for the shake correction amount regardless of whether it is during the exposure period or the period other than the exposure period. On the other hand, when the range of the correction amount specified by the image limit is narrower than the range of the correction amount specified by the AF limit, for the same reason, in step S114, the maximum correction range change unit 123 sets, to the AF limit, the correction amount limit for the shake correction amount.

That is, the maximum correction range change unit 123 compares the first limit value and the second limit value in the consecutive image pickup mode. When the width of the target correction amount specified by the second limit value is narrower than the width of the target correction amount specified by the first limit value, the maximum correction range change unit 123 sets the limit value to the second limit value during both the exposure period and the period other than the exposure period. On the other hand, when the width of the target correction amount specified by the first limit value is narrower than the width of the target correction amount specified by the second limit value, the maximum correction range change unit 123 sets the limit value to the first limit value during both the exposure period and the period other than the exposure period.

Subsequently, in step S115, the camera controller 100 clamps the shake correction amount at the correction amount limit (first limit value or second limit value as the limit value for the target correction amount) set in steps S111 to S114. When the loop of the image stabilization control in steps S103 to S115 ends, the process proceeds to step S117 and the image stabilization control ends.

Figure 6:
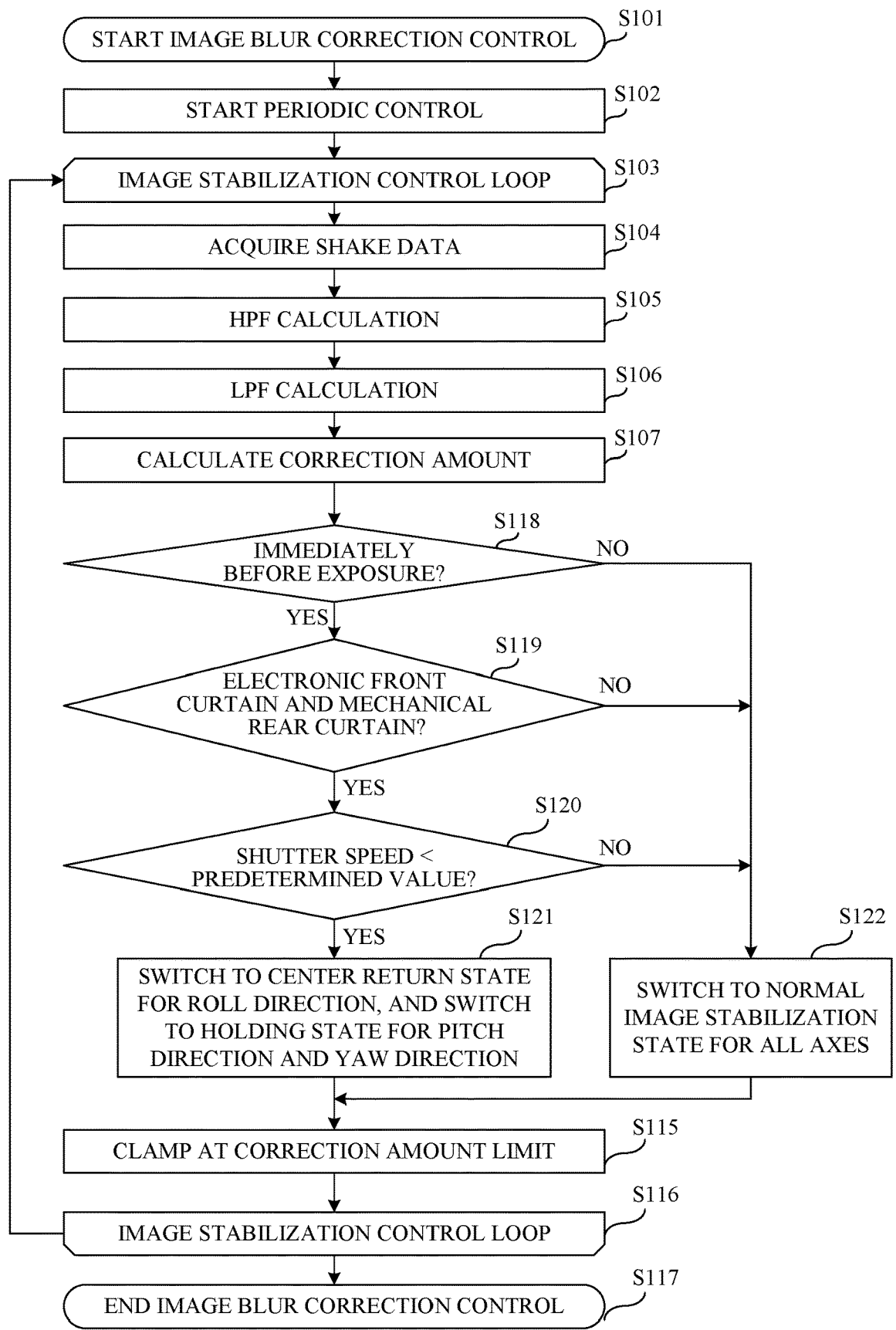
FIG. 6 is a flowchart illustrating a control method according to this embodiment.

Next, a description will be given of image stabilization processing (image stabilization control method) performed by the image pickup apparatus 10 with reference to FIG. 6. FIG. 6 is a flowchart illustrating the image stabilization processing (control method). FIG. 6 illustrates a position control processing for the image sensor 105, the processing making uneven exposure inconspicuous, when the shutter speed of the electronic front curtain and the mechanical rear curtain mode is fast. Steps S101 to S107, S115, and S116 in FIG. 6 are the same as those in FIG. 5, and thus a description thereof will be omitted.

In step S118, the camera controller 100 determines whether or not the state is immediately before exposure. When the state is immediately before the exposure, the process proceeds to step S119. In step S119, the camera controller 100 determines whether or not the electronic front curtain and the mechanical rear curtain are to be used. When the electronic front curtain and the mechanical rear curtain are to be used, the process proceeds to step S120. In step S120, the camera controller 100 determines whether or not the shutter speed is less than a predetermined value, that is, whether or not the shutter is a high-speed shutter. When the conditions in steps S118 to S120 are met, the image pickup condition is such that the uneven exposure is conspicuous. Hence, in step S121, the camera controller 100 switches to a center return state for the roll direction, and switches to a holding state for each of the pitch direction and the yaw direction.

On the other hand, when at least one of the conditions in steps S118 to S120 is not satisfied, the image pickup condition is not such that the uneven exposure is conspicuous. Thus, in step S122, the camera controller 100 switches to a normal image stabilization state for all axes, i.e., the pitch direction, yaw direction, and roll direction.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In the consecutive image pickup mode, this embodiment reduces the vibration generated by the steep operation by the image sensor at the time of switching between the image limit and the AF limit, and thereby can reduce the occurrence of the vibration that is uncomfortable for the user and of unnatural feeling. Therefore, according to this embodiment, it is possible to provide a control apparatus, an image pickup apparatus, a control method, and a memory medium each of which can reduce vibration based on the steep operation of the image sensor during image stabilization control.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

For example, the disclosure is not limited to the image pickup apparatus, and is also applicable to a portable device having an image pickup apparatus. Further, the first mode and the second mode, which are the image pickup conditions, are not limited to the single image pickup mode and the consecutive image pickup mode, respectively, and may be other modes that can be selected by the user.

This application claims the benefit of Japanese Patent Application No. 2020-076365, filed on Apr. 22, 2020 which is hereby incorporated by reference herein in its entirety.

What is claimed is:
1. An apparatus comprising:
at least one processor; and
at least one memory coupled to the at least one processor storing instructions that, when executed by the at least one processor, cause the processor to function as:

a calculation unit configured to calculate a target correction amount based on a shake detected by a detection unit;
a stabilization control unit configured to provide control on driving of a sensor in a direction intersecting an optical axis of a pickup optical system, based on the target correction amount;
an autofocusing control unit configured to provide control on focusing, based on an image signal output from the sensor; and
a setting unit configured to set a limit value for the target correction amount,
wherein the setting unit is configured to set the limit value so that the limit value of the target correction amount becomes smaller during a first exposure period for a first image pickup when a consecutive image pickup mode is set as an image pickup mode than during a second exposure period for a second image pickup when a first mode which is different from the consecutive image pickup mode is set as the image pickup mode, and
wherein in the consecutive image pickup mode, at least when a range of the target correction amount specified by a second limit value based on focusing accuracy of the autofocusing control unit is narrower than a range of the target correction amount specified by a first limit value based on a characteristic of the pickup optical system, the setting unit sets the limit value to the second limit value during both an exposure period and a period other than an exposure period.

2. The apparatus according to claim 1, wherein in a case where the first mode which is different from the consecutive image pickup mode is set, the setting unit sets the limit value to a first limit value during an exposure period, and to a second limit value which is smaller than the first limit value during a period other than an exposure period.

3. The apparatus according to claim 2, wherein the first mode is a single image pickup mode.

4. The apparatus according to claim 2, wherein in a case where the consecutive image pickup mode is set, the second limit value is set during the exposure period and the period other the exposure period.

5. The apparatus according to claim 1,
wherein in the consecutive image pickup mode, when the range of the target correction amount specified by the first limit value is narrower than the range of the target correction amount specified by the second limit value, the setting unit sets the limit value to the first limit value during both the exposure period and the period other than the exposure period.

6. The apparatus according to claim 1, wherein in a case where the first mode is set, the setting unit sets the limit value to the first limit value during an exposure period for a third image pickup and during an exposure period for a fourth image pickup, and sets the limit value to the second limit value during a period between the exposure period for the third image pickup and the exposure period for the fourth image pickup.

7. A pickup apparatus comprising:
a sensor configured to photoelectrically convert an optical image formed via a pickup optical system; and
an apparatus, wherein the apparatus includes:
at least one processor; and
at least memory coupled to the at least one processor storing instructions that, when executed by the at least one processor, cause the processor to function as:

a calculation unit configured to calculate a target correction amount based on a shake detected by a detection unit;
a stabilization control unit configured to provide control on driving of the sensor in a direction intersecting an optical axis of a pickup optical system, based on the target correction amount;
an autofocusing control unit configured to provide control on focusing based on an image signal output from the sensor; and
a setting unit configured to set a limit value for the target correction amount,
wherein, the setting unit is configured to set the limit value so that the limit value of the target correction amount becomes smaller during a first exposure period for a first image pickup when a consecutive image pickup mode is set as an image pickup mode than during a second exposure period for a second image pickup when a first mode which is different from the consecutive image pickup mode is set as the image pickup mode, and
wherein in the consecutive image pickup mode, at least when a range of the target correction amount specified by a second limit value based on focusing accuracy of the autofocusing control unit is narrower than a range of the target correction amount specified by a first limit value based on a characteristic of the pickup optical system, the setting unit sets the limit value to the second limit value during both an exposure period and a period other than an exposure period.

8. A method comprising:
calculating a target correction amount based on a shake detected by a detection unit;
providing control on driving of a sensor in a direction intersecting an optical axis of a pickup optical system, based on the target correction amount;
providing control on focusing based on an image signal output from the sensor; and
setting a limit value for the target correction amount,
wherein, in the setting the limit value, the limit value is set so that the limit value of the target correction amount becomes smaller during a first exposure period for a first image pickup when a consecutive image pickup mode is set as an image pickup mode than during a second exposure period for a second image pickup when a first mode which is different from the consecutive image pickup mode is set as the image pickup mode, and
wherein in the consecutive image pickup mode, at least when a range of the target correction amount specified by a second limit value based on focusing accuracy of the autofocusing control unit is narrower than a range of the target correction amount specified by a first limit value based on a characteristic of the pickup optical system, the setting unit sets the limit value to the second limit value during both an exposure period and a period other than an exposure period.

9. The method according to claim 8, wherein in a case where the first mode which is different from the consecutive image pickup mode is set, the setting sets the limit value to a first limit value during an exposure period, and to a second limit value which is smaller than the first limit value during a period other than an exposure period.

10. The method according to claim 9, wherein the first mode is a single image pickup mode.

11. A non-transitory computer-readable storage medium storing a computer program that causes a computer to execute a method, the method comprising:
  calculating a target correction amount based on a shake detected by a detection unit;
  providing control on driving of a sensor in a direction intersecting an optical axis of a pickup optical system, based on the target correction amount;
  providing control on focusing based on an image signal output from the sensor; and
  setting a limit value for the target correction amount,
  wherein, in the setting the limit value, the limit value is set so that the limit value of the target correction amount becomes smaller during a first exposure period for a first image pickup when a consecutive image pickup mode is set as an image pickup mode than during a second exposure period for a second image pickup when a first mode which is different from the consecutive image pickup mode is set as the image pickup mode, and
  wherein in the consecutive image pickup mode, at least when a range of the target correction amount specified by a second limit value based on focusing accuracy of the autofocusing control unit is narrower than a range of the target correction amount specified by a first limit value based on a characteristic of the pickup optical system, the setting unit sets the limit value to the second limit value during both an exposure period and a period other than an exposure period.

12. The non-transitory computer-readable storage medium according to claim 11, wherein in a case where the first mode which is different from the consecutive image pickup mode is set, the setting sets the limit value to a first limit value during an exposure period, and to a second limit value which is smaller than the first limit value during a period other than an exposure period.

13. The non-transitory computer-readable storage medium according to claim 12, wherein the first mode is a single image pickup mode.

14. An apparatus comprising:
  at least one processor; and
  at least memory coupled to the at least one processor storing instructions that, when executed by the at least one processor, cause the processor to function as:
    a calculation unit configured to calculate a target correction amount based on a shake detected by a detection unit;
    a stabilization control unit configured to provide control on driving of a sensor in a direction intersecting an optical axis of a pickup optical system, based on the target correction amount;
    an autofocusing control unit configured to provide control on focusing, based on an image signal output from the sensor; and
    a setting unit configured to set a limit value for the target correction amount,
    wherein in a case where a consecutive image pickup mode is set as an image pickup mode, the setting unit is configured to set the limit value to a same limit value between a first exposure period for a first image pickup and a period between the first exposure period and a second exposure period for a second image pickup which is performed after the first image pickup, and
    wherein in the consecutive image pickup mode, at least when a range of the target correction amount specified by a second limit value based on focusing accuracy of the autofocusing control unit is narrower than a range of the target correction amount specified by a first limit value based on a characteristic of the pickup optical system, the setting unit sets the limit value to the second limit value during both an exposure period and a period other than an exposure period.

15. The apparatus according to claim 14, wherein in a case where the first mode which is different from the consecutive image pickup mode is set, the setting unit sets the limit value to a first limit value during an exposure period, and to a second limit value which is smaller than the first limit value during a period other than an exposure period.

16. The apparatus according to claim 15, wherein in a case where a first mode which is different from the consecutive image pickup mode is set, the setting unit sets the limit value to the first limit value during an exposure period for a third image pickup and during an exposure period for a fourth image pickup, and sets the limit value to the second limit value during a period between the exposure period for the third image pickup and the exposure period for the fourth image pickup.

17. The apparatus according to claim 16, wherein the first mode is a single image pickup mode.

* * * * *